United States Patent [19]
Takemoto et al.

[11] Patent Number: 5,517,010
[45] Date of Patent: May 14, 1996

[54] RECORD MEDIUM READING APPARATUS, BALL DISPENSER AND METAL DISPENSER

[75] Inventors: Takatoshi Takemoto; Kazunari Kawashima, both of Tokyo, Japan

[73] Assignee: Kabushiki Kaisha Ace Denken, Tokyo, Japan

[21] Appl. No.: 916,991

[22] PCT Filed: Oct. 4, 1991

[86] PCT No.: PCT/JP91/01358

§ 371 Date: Aug. 18, 1992

§ 102(e) Date: Aug. 18, 1992

[87] PCT Pub. No.: WO92/11910

PCT Pub. Date: Jul. 23, 1992

[30] Foreign Application Priority Data

Dec. 27, 1990 [JP] Japan ................................. 2-407695

[51] Int. Cl.$^6$ .................................................. G06K 13/20
[52] U.S. Cl. .............................. 235/380; 235/477; 902/23
[58] Field of Search .................................. 235/449, 380, 235/384, 477, 480; 902/23

[56] References Cited

U.S. PATENT DOCUMENTS

| | | | |
|---|---|---|---|
| 3,501,622 | 4/1966 | Weir et al. | 235/384 |
| 3,731,076 | 5/1973 | Nagata et al. | 235/380 |
| 3,818,187 | 6/1974 | Lovendusky et al. | 235/380 |
| 3,850,299 | 11/1974 | Kreitzer . | |
| 3,869,700 | 7/1975 | Cook et al. | 235/380 |
| 4,181,920 | 1/1980 | Cerekas | 235/449 X |
| 4,373,158 | 2/1983 | Orloff | 235/492 X |
| 4,575,622 | 3/1986 | Pellegrini | 235/382 |
| 4,605,843 | 8/1986 | Aubrey | 235/486 X |
| 4,864,114 | 9/1989 | Briane et al. | 235/477 |
| 5,043,561 | 8/1991 | Kimata | 235/375 X |
| 5,089,694 | 2/1992 | Zerfahs et al. | 235/449 X |

FOREIGN PATENT DOCUMENTS

| | | |
|---|---|---|
| 2558325 | 7/1985 | France . |
| 56-3025 | 1/1981 | Japan . |
| 63-317175 | 12/1988 | Japan . |
| 64-34390 | 2/1989 | Japan . |
| 1-110383 | 4/1989 | Japan . |
| 1-152593 | 6/1989 | Japan . |
| 1559161 | 1/1980 | United Kingdom . |

*Primary Examiner*—John Shepperd
*Attorney, Agent, or Firm*—Lowe, Price, LeBlanc & Becker

[57] ABSTRACT

A record medium reading apparatus, a pachinko ball dispenser and a medal dispenser which can reduce the cost of production of record mediums and can realize an effective use of resources.

When a discriminating means discriminates that there is no remaining data as the record medium has been full used, a conveying control unit controls a conveyer so as to convey, after reading, the record medium into a case for collection.

4 Claims, 5 Drawing Sheets

RECORD MEDIUM READING APPARATUS, BALL DISPENSER AND METAL DISPENSER

FIELD OF TECHNOLOGY

This invention relates to a record medium reading apparatus for reading recorded data from a record medium such as a magnetic card, and also to game medium dispensers, such as a ball dispenser and a medal dispenser, using the record medium reading apparatus. The reading apparatus and the dispensers are to be used in a game house where many game machines such as slot machines and/or pachinko game machines are installed.

BACKGROUND TECHNOLOGY

In a game medium dispenser using a conventional record medium reading apparatus, when a record medium such as a magnetic card is inserted, the record medium reading apparatus takes the record medium in, reads recorded data from the record medium and subtracts predetermined subtrahend data from the recorded data, whereupon a number of game mediums corresponding to the subtrahend data are dispensed. Meanwhile the magnetic card is returned to the inlet after the subtrahend data has been subtracted and a record of this made on the card.

However, with this conventional art, when the recorded data of the record medium is reduced to zero, this used-up record medium is returned to the customer from the inlet. If it undergoes a regenerative process, the used-up record medium can be made reusable. Nonetheless, since a used-up record medium is discarded, it results in an increased cost of production of record mediums so that an effective use of resources cannot be achieved.

With the foregoing problems of the conventional art in view, it is an object of this invention to provide a record medium reading apparatus and a game medium dispenser, such as a ball dispenser and a medal dispenser, which result in not only a reduced cost of production of the record medium but also an effective use of the resource.

DISCLOSE OF INVENTION

According to one aspect of this invention, there is provided a record medium reading apparatus comprising: an inlet through which a reloadable record medium is to be inserted; an insertion detecting sensor for detecting that the record medium has been inserted from the inlet; a case for receiving the record medium; a conveying path extending between the inlet and the case; a conveyer for conveying the record medium along the conveying path; a reader disposed at some point along the conveying path for reading the recorded data from the record medium; a memory for analyzing and storing the record data read by the reader; an arithmetic unit for subtracting a predetermined subtrahend data from the recorded data, which is stored in the memory, to obtain remaining data; an eraser disposed more toward the case than the reader for erasing the recorded data of the record medium; a recorder disposed more toward the case than the reader for recording on the record medium the remaining data obtained by the arithmetic means; a return position detecting sensor for detecting the presence of the record medium at a post-record position after recording has been completed by the recorder; and means for discriminating whether or not the remaining data obtained by the arithmetic means is zero. The apparatus further comprises a conveying control unit for controlling the conveyer, in response to the detection by the insertion detecting sensor and the return position detecting sensor. When the insertion detection sensor detectors the presence of the record medium which has been inserted from said inlet, the conveyer is controlled so as to convey the record medium toward the case along the conveying path. In response to the detection by the return position detecting sensor, when the discriminating means discriminates the remaining data as not zero. The conveyer is controlled so as to convey the record medium, which is located at the post-record position, toward the inlet along the conveying path, and when the discriminating means discriminates the remaining data as zero, the conveyer is controlled so as to convey the record medium, which is located at a post-read position after reading by the reader, into the case.

Preferably, the record medium reading apparatus further includes an alarm for issuing an audio or visual signal when the discriminating means discriminates the remaining data as zero.

According to another aspect of the invention, there is provided a pachinko ball dispenser comprising the above-mentioned record medium reading apparatus, and a pachinko ball discharge device for dispensing a number of pachinko balls corresponding to the predetermined subtrahend data.

According to still another aspect of the invention, there is provided a medal dispenser comprising the above-mentioned record medium reading apparatus, and a medal discharge device for dispensing a number of medals corresponding to the predetermined subtrahend data.

When a reloadable record medium is inserted into the inlet, the insertion detecting sensor detects the record medium and the conveying control means controls the conveyer so as to convey the record medium into the conveying path from the inlet. The reader reads the recorded data of the record medium, and the recorded data is stored in a memory. After reading, the record medium is conveyed by the conveyer to the eraser where the recorded data is erased. After erasing, the recorder records in the record medium the remaining data obtained by the arithmetic unit. If the return position detecting sensor detects the record medium when the discriminating means discriminates that the record medium has record data remaining, the conveying control unit controls the conveyer so as to convey the record medium to the inlet. When the record medium is used up and when the discriminating means discriminates that there is no data remaining, the conveying control unit controls the conveyer so as to convey the record medium, after reading, into the case for collection.

PREFERRED EMBODIMENT OF INVENTION

One embodiment of this invention will now be described with reference to the accompanying drawings.

Figure 3:
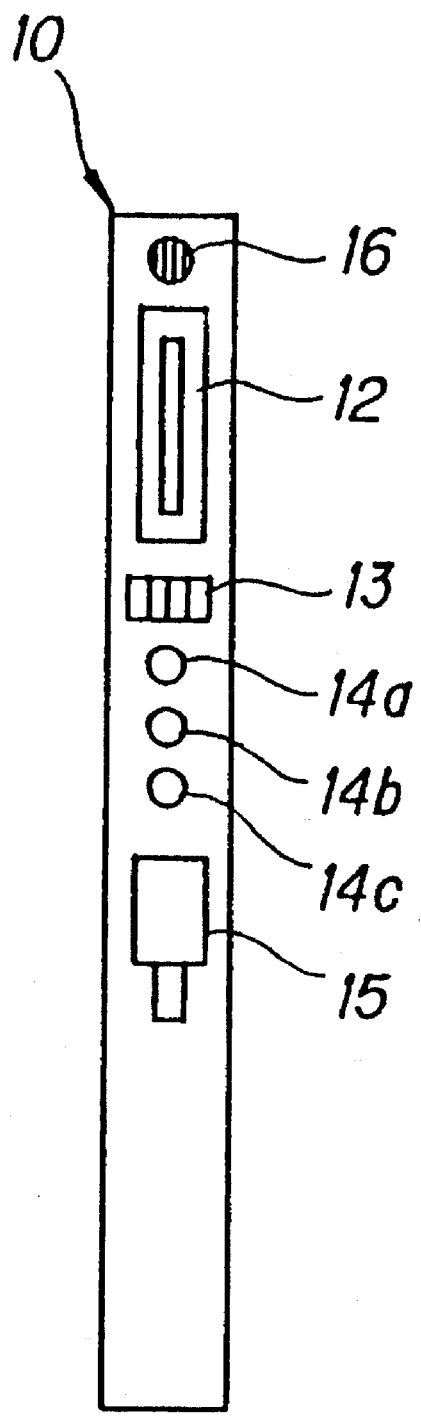
FIG. 3 is a front view of the ball dispenser.

As shown in FIG. 3, a ball dispenser 10 has on its front side an inlet 12 for a card 11, a display 13, three selection switches 14a, 14b, 14c, a ball tray 15, and an alarm 16. The selection switches 14a, 14b, 14c are switches for dispensing pachinko balls corresponding to 1000 yen, 500 yen and 300 yen, respectively. By these selection switches, the respective sum values may be selectively set as predetermined deduction data. The ball tray 15 is a discharge tray to which a number of pachinko balls corresponding to the sum value selected by the selection switches 14a, 14b, 14c are to be dispensed.

Figure 1:
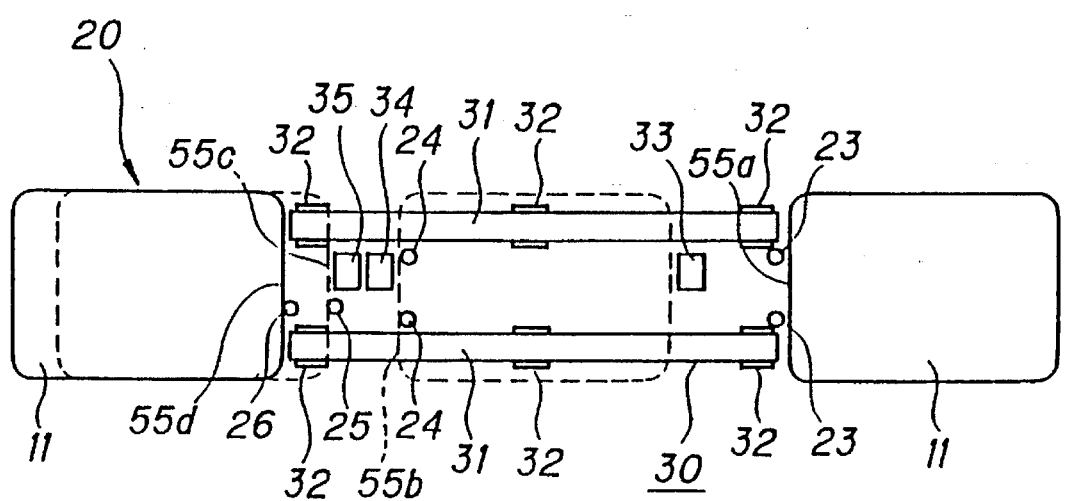
FIG. 1 is a side view showing the drive side of a record medium reading apparatus used in a ball dispenser according to one embodiment of this invention.
Figure 2:
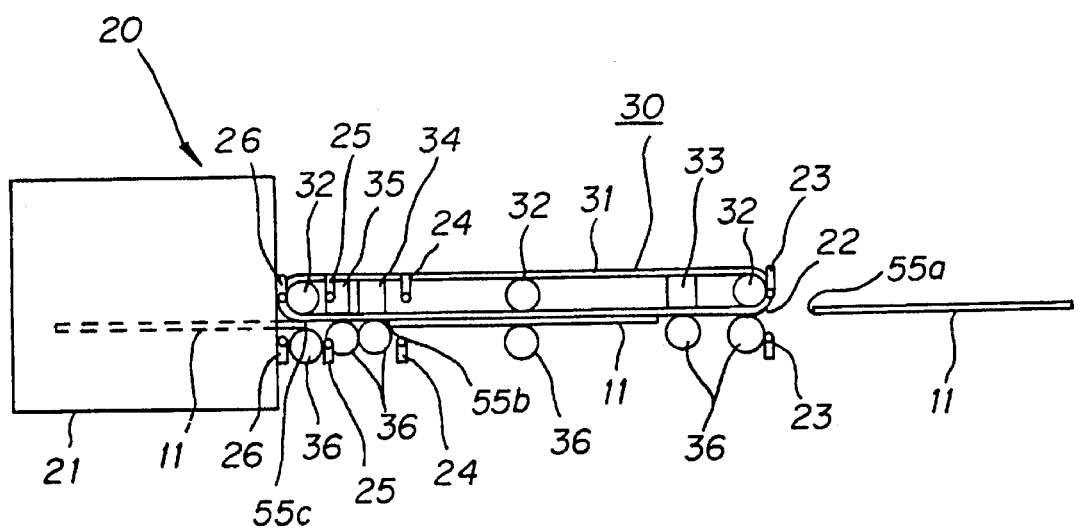
FIG. 2 is a plan view of the record medium reading apparatus.

With reference to FIGS. 1–4, inside the ball dispenser 10 a record medium reading apparatus 20 of FIG. 1 is mounted. The record medium reading apparatus 20 has an inlet 12, a case 21 for receiving a card 11, and a conveying path 22 extending between the inlet 12 and the case 21. The card 11 is a reloadable record medium in the form of a rectangular magnetic card, i.e. a so-called prepaid card onto which recorded data is magnetically recordable. This recorded data is data representing sum value which enables the corresponding number of pachinko balls to be dispensed.

The conveying path 22 is defined by an upper rail 13a and a lower rail 13b along which the card 11 is to be conveyed. At the inlet of the conveying path 22, two pairs of insertion detecting sensors 23 are disposed, one pair above the conveying path 22 and the other pair below the conveying path 22. The insertion detecting sensor 23 is an optosensor for detecting a card 11 inserted from the inlet 12. The conveying path 22 extends straightly from the vertical inlet 12, and the case 21 for receiving a card 11 has on the side nearest the conveying path 22 an opening 21a substantially equal in size to the card 11 and is disposed sidewardly of the end of the conveying path 22.

In the conveying path 22, a conveyer 30 for conveying a card 11 between the inlet 12 and the case 21 is disposed. The conveyer 30 includes upper and lower belts 31 each wound around three pulleys 32, which rotate, when driven by power, to drive the associated belt 31. Near the inlet of the conveying path 22, a reading head 33 for reading the recorded data of a card 11 is disposed. On the display 13, a sum value of the recorded data read by the reading head 33 is displayed in decimal digits. On the case side of the reading head 33, an erasing head 34 for erasing the recorded data of a card 11 is disposed. On the case side of the erasing head 34, a recording head 35 for recording data onto a card 11 is disposed. Further, a number of tension rollers 36 are disposed so as to respectively confront the pulleys 32, the reading head 33, the erasing head 34 and the recording head 35.

Figure 5:
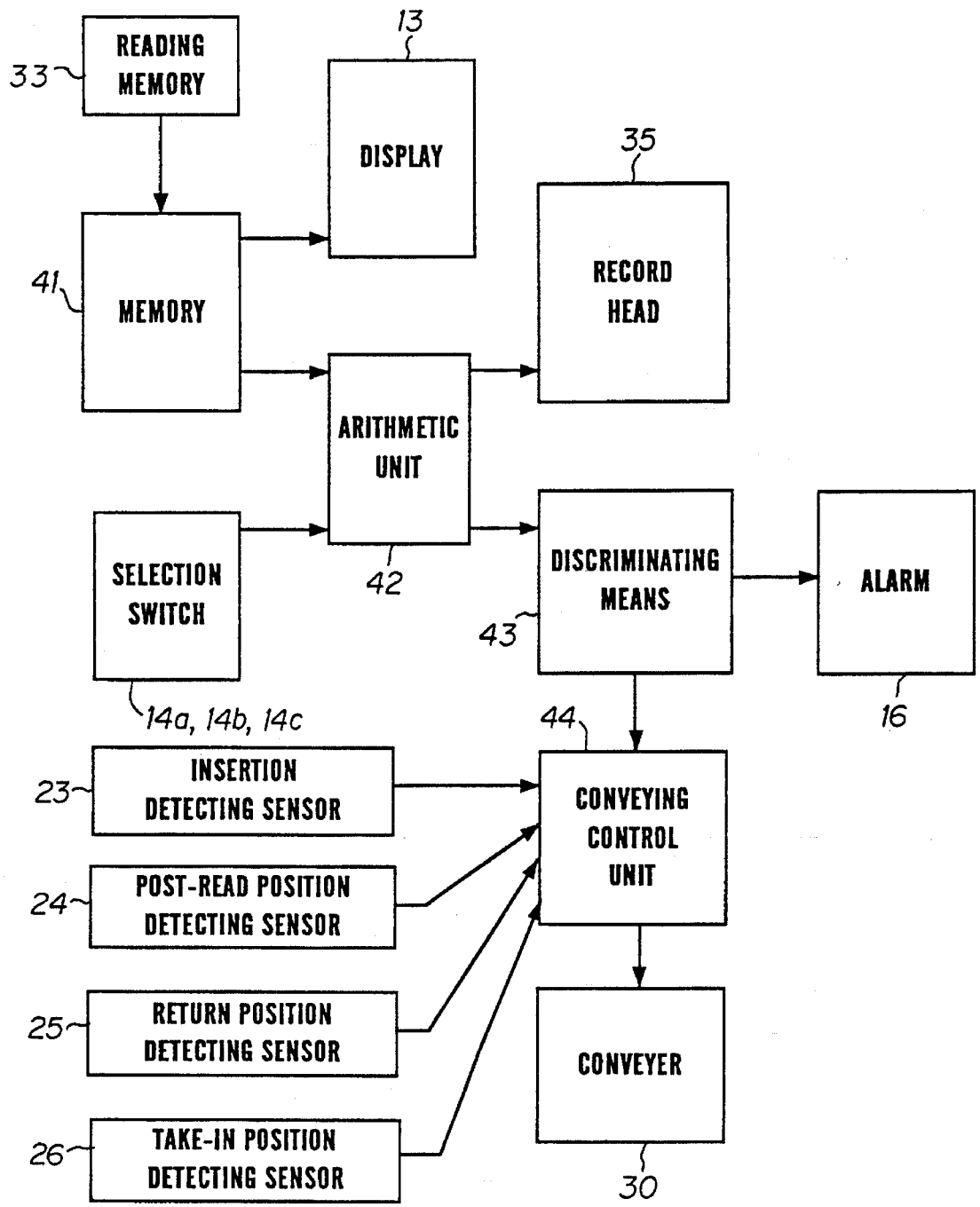
FIG. 5 is a block diagram of the record medium reading apparatus.

As shown in FIG. 5, inside the ball dispenser 10, there are disposed a memory 41, an arithmetic unit 42, a discriminating means 43 and a conveying control unit 44. These units and means may be realized by a programmable microcomputer or the like. This microcomputer comprises a CPU, a ROM, a RAM, an interface, etc.

The memory 41 stores the recorded data read by the reading head 33. The arithmetic unit 42 obtains remaining data by subtracting the sum value represented by a predetermined subtrahend data determined by the selection switches 14a, 14b, 14c. With the arithmetic unit 42, if the sum value represented by a predetermined subtrahend data is equal to or larger than the recorded data stored in the memory 41, the remaining data is regarded as zero. As the arithmetic unit 42 obtains the remaining data, a number of pachinko balls corresponding to the sum value selected by the selection switches 14a, 14b, 14c are discharged into the ball tray 15. On the display 13, a sum value of the remaining data obtained by the arithmetic unit 42 is displayed in decimal digits. The recording head 35 records onto a card 11 the remaining data obtained by the arithmetic unit 42. The discriminating means 43 discriminates whether or not the remaining data from the arithmetic unit 42 is zero.

At a position near the erasing head 34 and toward the inlet 12, there are disposed two pairs of post-read position detecting sensors 24, one pair over the conveying path 22 and the other pair below the conveying path 22. The post-read position detecting sensor 24 is an optosensor for detecting the card 11 after the recorded data of the card 11 has been read by the reading head 33. Near the recording head 35, a pair of return position detecting sensors 25 are disposed on opposite sides of the conveying path 22. The return position detecting sensor 25 is an optosensor for detecting that the card 11 is located at the post-cord position after recording by the recording head 35. Near the case 21, a pair of take-in position detecting sensor 26 is disposed on opposite sides of the conveying path 22. The take-in position detecting sensors 26 are an optosensor for detecting that the card 11 is located at such a position as to be taken into the case 21.

The conveying control unit 44 controls the conveyer 30, in response to the discrimination means and the detection by the various sensors 23, 24, 25 and 26 so as to carry out variable conveyance of the card 11. In response to detection by the insertion detecting sensor 23, the card 11, which is inserted from the inlet 12, is conveyed toward the case 21 along the conveying path 22. In response to the detection by the post-read position detecting sensor 24, the conveyer 30 is caused to temporarily stop conveying. Then when the discriminating means 43 discriminates the remaining data to be not zero, the card 11 is conveyed toward the case 21, and in response to the detection by the return position detecting sensor 25, the card 11, which has arrived at the position detected by the return position detecting sensor 25, is conveyed to the inlet along the conveying path 22. When the remaining data is discriminated to be zero, the card 11, which is located at the post-read position after reading by the reading head 33, is conveyed into the case 21 until the card 11 is detected by the take-in position detecting sensor 26.

When the discriminating means 43 discriminates the remaining data to be zero, the alarm 16 issues an audio signal saying "The sum value which had been recorded on the card has been spent, and the card will now be taken in."

On the bottom 21d of the case 21, a card receiving plate 51 normally urged toward the opening 21a by a spring 52 is mounted. In the conveying path 22 at a position confronting the card receiving plate 51, a card take-in pad 53 is disposed. The card take-in pad 53 is reciprocatingly moved into the case in response to the detection by the take,in position detecting sensor 26 and is then returned to the original position. The upper and lower rails 13a, 13b are open at the side of the opening 21a of the case 21, and between the opening 21a and the upper rail 13a and between the opening 21a and the lower rail 13b, there are disposed upper and lower dampers 54a, 54b, respectively, which resiliently hold the card 11 between the upper and lower rails 13a, 13b and open toward the inside of the case 21 when the card 11 is pushed toward the opening 21a of the case 21.

The operation of the apparatus will now be described.

In FIG. 1, assuming that pachinko balls are to be dispensed, when a card 11 is inserted into the inlet 12 from a card insertion position 55a, the insertion detecting sensor 23 detects the card 11 whereupon the conveying control unit 44 controls the belts 31 of the conveyer 30 so as to convey the card 11 into the conveying path 22 from the inlet 12. The reading head 33 reads the sum value of the recorded data of the card 11, and this data is stored in the memory 41 while the sum value is displayed on the display 13.

After reading, when the card 11 is conveyed further inwardly by the belts 31 and is detected by the post-read position detecting sensor 24, the conveying control unit 44 controls the belts 31 so as to temporarily stop the card 11 at a temporary standby position 55b. Then the number of balls corresponding to one of 300 yen, 500 yen and 1000 yen is selected by the selection switches 14a, 14b, 14c. The arithmetic unit obtains remaining data by subtracting from the sum value of the record data of the card 11 a sum value of subtrahend data selected by the selection switches 14a, 14b, 14c. Simultaneously, a number of pachinko balls corresponding to the sum value of the subtrahend data is supplied to the ball tray 15 so as to be taken out by the customer, and the sum value of the remaining data is displayed on the display 13. When the sum value of the subtrahend data selected by the selection switches 14a, 14b, 14c is larger than the sum value of the recorded data of the card 11, the number of pachinko balls corresponding to the sum value displayed on the display 13 are supplied to the ball tray 15, and the decimal numeral on the display 13 becomes zero.

After this temporary stop, when the discriminating means 43 discriminates that the card 11 has remaining data, the conveying control unit 44 controls the belts 31 so as to convey the card 11 toward the case 21. As the card 11 is conveyed over the erasing head 33 by the conveyer 30, the sum value of the recorded data is erased by the erasing head 34. After erasing, the recording head 35 disposed forwardly of the erasing head 34 records onto the card 11 the sum value of the remaining data obtained by the arithmetic unit 42.

When the return position detecting sensor 25 detects the card 11 at a card return position 55c, the conveying control unit 44 controls the belts 31 so as to convey the card 11 to the inlet 12 in the reverse direction. At that time, all of the recording head 35, the erasing head 34 and the reading head 33 are inoperable. The returned card 11 may be taken out from the inlet 12 so that it can be reused by the customer until the sum value of the recorded data becomes zero.

When the card 11 is used up and when the discriminating means 43 discriminates that there is no sum value of the remaining data, the conveying control unit 44 controls the conveyer 30 so as to convey the card 11. The erasing head 34 erases the sum value of the recorded data of the card 11, and the conveyer 30 continues conveying the card 11 until the card 11 is detected by the take-in position detecting sensor 26. As it is guided by the upper and lower rails 13a, 13b, the card 11 is conveyed into the case 21 located in a take-in card store area 56.

Figure 4A:
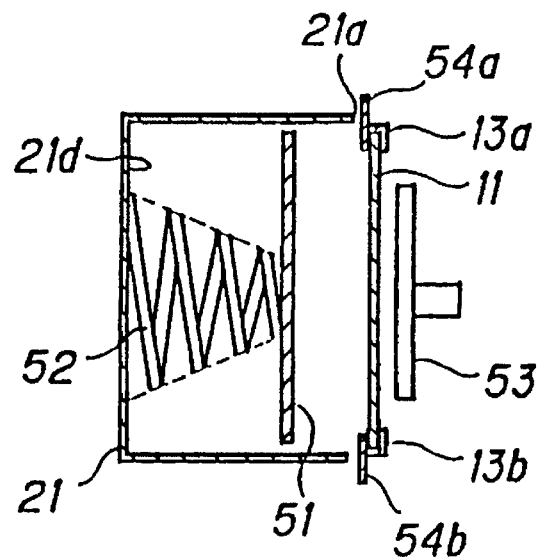
FIGS. 4A–C are cross-sectional views showing the manner in which a card is received in a case.
Figure 4B:
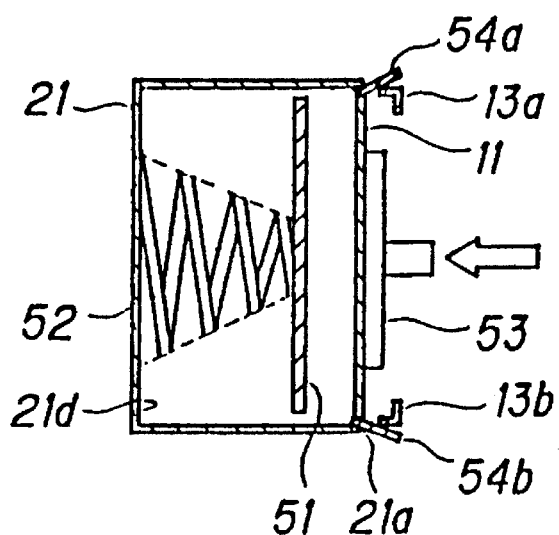
Figure 4C:
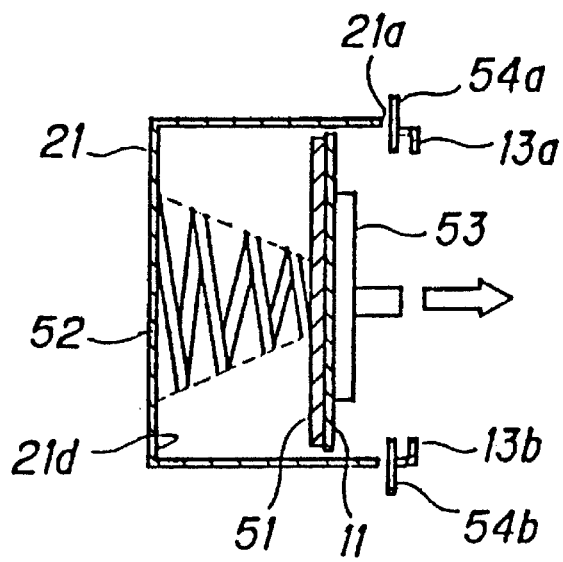

As shown in FIGS. 4(A), 4(B) and 4(C), in response to the detection by the take-in position detecting sensor 26, the card take-in pad 53 is reciprocatingly moved into the case 21 to push the card 11 in the card take-in position 55d, forcing the upper and lower dampers 54a, 54b to open inwardly of the case 21 so that the card 11 is collected in the case 21. At the same time, the alarm 16 alerts the customer by sound that the card is to be taken into the case. The card 11 stored in the case 21 may be treated by a regenerative process for reuse.

A card 11 may be dispensed from a card dispenser by inserting money. Preferably the ball dispenser is installed near game machines.

In this embodiment, a magnetic card is used as the record medium. Other reloadable record mediums such as RAM may be used. The recorded data of the record medium, the subtrahend data to be selected by the selection switches and the remaining data may be decimal digits of sum value, the number of pachinko balls or the number of medals.

Further in the illustrated embodiment, this invention is applied to a pachinko ball dispenser. This invention may likewise be applied to a medal dispenser to be used in a slot machine game house, the medal dispenser being equipped with a medal discharger for dispensing a number of medals corresponding to predetermined subtrahend data.

The medal dispenser has a construction identical with the ball dispenser shown on FIG. 3. The medal discharger can use the ball tray 15 of the ball dispenser. In other words, a number of medals according to the sum value corresponding to any of the selected switches among switch 14a, 14b, and 14c are discharged into the ball tray 15.

The predetermined subtrahend data may be data determined by the selection switches or a single datum preprogrammed into the arithmetic unit.

To alert the customer that a card is to be taken into the case, the alarm may be a device for issuing an audio voice signal, a buzzer for issuing an audio buzz signal, a panel for issuing a visual signal in the form of numerals, a lamp for issuing a visual signal by lighting up or flashing the lamp, or any combination thereof.

UTILITY OF INVENTION

With the record medium reading apparatus, ball dispenser and medal dispenser according to this invention, since used-up record mediums are collected inside, it is possible not only to reduce the cost of production of record mediums but also to realize an effective use of the resource.

We claim:

1. A record medium reading apparatus comprising:
   an inlet through which a reusable card-form record medium is to be inserted;
   an insertion detecting sensor for detecting the reusable card-form record medium inserted from said inlet;
   a case for receiving said reusable card-form record medium;
   a conveying path extending between said inlet and said case;
   a conveyor for conveying said reusable card-form record medium along said conveying path;
   a reader disposed in said conveying path for reading the recorded data of said reusable card-form record medium;
   a memory for storing the recorded data read by said reader;
   an arithmetic means for subtracting a predetermined subtrahend data from the recorded data, which is stored in said memory, to obtain remaining data;
   an eraser disposed more toward said case than said reader for erasing the recorded data of said reusable card-form record medium;
   a recorder disposed more toward said case than said reader for recording in said reusable card-form record medium the remaining data obtained by said arithmetic means;
   a return position detecting sensor for detecting the presence of said reusable card-form record medium at a post-record position after recording by said recorder;
   means for discriminating whether or not the remaining data obtained by said arithmetic means is zero;
   a conveying control unit for controlling, in response to the detection by said insertion detecting sensor, said conveyor so as to convey said reusable card-form record medium, which is inserted from said inlet, toward said case through said conveying path, said conveying control unit further comprising a first control means for conveying said reusable card-form record medium when at said post-record position toward said inlet responsive to detection by said return position detecting sensor and said discriminating means determining that said remaining data is not zero and a second control means for conveying said reusable card-form record medium when at a post-read position after reading by said reader toward said case responsive to said discriminating means determining that said remaining data is zero and for storing said reusable card-form record medium in said case for reuse, wherein the case is designed to store the record medium in an upright position under compression.

2. The record medium reading apparatus according to claim 1, wherein compression is effected by springs.

3. A record medium reading apparatus comprising:

an inlet through which a reusable card-form record medium is to be inserted;

an insertion detecting sensor for detecting the reusable card-form record medium inserted from said inlet;

a case for receiving said reusable card-form record medium;

a conveying path extending between said inlet and said case;

a conveyor for conveying said reusable card-form record medium along said conveying path;

a reader disposed in said conveying path for reading the recorded data of said reusable card-form record medium;

a memory for storing the recorded data read by said reader;

an arithmetic means for subtracting a predetermined subtrahend data from the recorded data, which is stored in said memory, to obtain remaining data;

an eraser disposed more toward said case than said reader for erasing the recorded data of said reusable card-form record medium;

a recorder disposed more toward said case than said reader for recording in said reusable card-form record medium the remaining data obtained by said arithmetic means;

a return position detecting sensor for detecting the presence of said reusable card-form record medium at a post-record position after recording by said recorder;

means for discriminating whether or not the remaining data obtained by said arithmetic means is zero;

a conveying control unit for controlling, in response to the detection by said insertion detecting sensor, said conveyor so as to convey said reusable card-form record medium, which is inserted from said inlet, toward said case through said conveying path, said conveying control unit further comprising a first control means for conveying said reusable card-form record medium when at said post-record position toward said inlet responsive to detection by said return position detecting sensor and said discriminating means determining that said remaining data is not zero and a second control means for conveying said reusable card-form record medium when at a post-read position after reading by said reader toward said case responsive to said discriminating means determining that said remaining data is zero and for storing said reusable card-form record medium in said case for reuse, wherein said case comprises a box-like member designed to stack and store therein a record medium in its width direction, said case comprising a bottom portion and a portion opposite to the bottom portion which contains an opening for accepting the record medium, further comprising a card take-in pad at a position opposite the bottom of the case.

4. A record medium reading apparatus comprising:

an inlet through which a reusable card-form record medium is to be inserted;

an insertion detecting sensor for detecting the reusable card-form record medium inserted from said inlet;

a case for receiving said reusable card-form record medium;

a conveying path extending between said inlet and said case;

a conveyor for conveying said reusable card-form record medium along said conveying path;

a reader disposed in said conveying path for reading the recorded data of said reusable card-form record medium;

a memory for storing the recorded data read by said reader;

an arithmetic means for subtracting a predetermined subtrahend data from the recorded data, which is stored in said memory, to obtain remaining data;

an eraser disposed more toward said case than said reader for erasing the recorded data of said reusable card-form record medium;

a recorder disposed more toward said case than said reader for recording in said reusable card-form record medium the remaining data obtained by said arithmetic means, a return position detecting sensor for detecting the presence of said reusable card-form record medium at a post-record position after recording by said recorder;

means for discriminating whether or not the remaining data obtained by said arithmetic means is zero;

a conveying control unit for controlling, in response to the detection by said insertion detecting sensor, said conveyor so as to convey said reusable card-form record medium, which is inserted from said inlet, toward said case through said conveying path, said conveying control unit further comprising a first control means for conveying said reusable card-form record medium when at said post-record position toward said inlet responsive to detection by said return position detecting sensor and said discriminating means determining that said remaining data is not zero and a second control means for conveying said reusable card-form record medium when at a post-read position after reading by said reader toward said case responsive to said discriminating means determining that said remaining data is zero and for storing said reusable card-form record medium in said case for reuse, wherein said case comprises a box-like member designed to stack and store therein a record medium in its width direction, said case comprising a bottom portion and a portion opposite to the bottom portion which contains an opening for accepting the record medium, further comprising a card receiving plate and a spring positioned within the case so that the receiving plate is normally biased toward the opening.

* * * * *